June 20, 1933. P. F. SCHADE 1,914,897
MEANS FOR PROTECTING GAS OR WATER PIPES, ELECTRIC CABLES, OR THE LIKE
Filed June 25, 1930
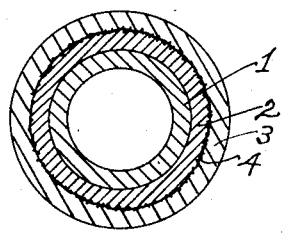
Paul F. Schade  Inventor
By his Attorneys
Gifford, Scull & Burgess Patented June 20, 1933

1,914,897

UNITED STATES PATENT OFFICE

PAUL F. SCHADE, OF BERLIN, GERMANY, ASSIGNOR TO CHEMIEPRODUKTE G. M. B. H., OF BERLIN, GERMANY

MEANS FOR PROTECTING GAS OR WATER PIPES, ELECTRIC CABLES, OR THE LIKE

Application filed June 25, 1930, Serial No. 463,837, and in Germany June 25, 1929.

This invention relates to a novel protective means, protective mass or the like for protecting underground gas or water pipes, electric cables or the like against corrosion or similar destruction as well as to a process of applying said protective means or mass to a gas or water pipe or electric cable.

According to my present invention, in contra-distinction to my copending applications for patent Serial Nos. 338,052, and 459,835, filed February 6, 1929, and June 7, 1930, respectively, and my Patent No. 1,777,107, September 30, 1930 I use a plain mass of special consistency without the aid of any carrier or core in the form of a textile, rope or the like and eventually provide a further coating of asphaltum which may be applied in hot or cold condition either with or without the aid of a rope or cord of jute interposed between said protective mass proper and said coating of asphaltum.

The figure is a cross sectional view of a pipe protected with the plastic covering coated with asphaltum or the like and having jute interposed between the layers.

According to my present invention, more particularly, the gas or water pipe or electric cable to be protected against corrosion or similar destruction is provided with a homogeneous coating of protective mass which is permanently plastic, that is which retains its plasticity at all temperatures arising in the ground in proximity to the pipe or cable to be protected. The protective mass which I use according to my present invention is of the constituency described particularly in my aforementioned copending application for patent Serial No. 459,835 and of permanently plastic consistency, that is the mass retains its plasticity between temperatures up to 40° C. and down to −40° C. The consistency of said mass furthermore is such that at the highest temperature which may arise in the ground it will not become soft beyond a permissible degree and at the lowest temperature which may arise in the ground will likewise retain its plasticity and not become brittle. This is attained by properly composing the mass, for instance, from protoparaffines having a melting point above 50° C., mineral oil, jellies having a melting point of about 20° C. with or without the addition of soft bitumen having a melting point of about 30° C. Eventually also coal distillation products may be used and according to the desired degree of plasticity chemically resistive filling substances such as lime, heavy spar, porcelain earth or asbestos fiber may be added to the mass. The mixture forming part of my aforementioned co-pending application for patent Serial No. 459,835 may likewise be employed, if the protective mass is applied according to my present invention without the use of any core or carrier in the form of a textile, rope and the like but merely by applying the protective mass to the pipe or cable to be protected and thereupon eventually providing a further coating of asbestos upon said mass with or without interposition of a cord or rope of jute or the like which may serve as a mechanical reinforcement or support for said coating. The protective mass may be applied to the metal parts to be protected such as the pipes or cables at the place at which said pipes or cables are installed, said mass in particular being applied in the form or consistency of an ointment or paste by placing and distributing said mass either by hand or with the aid of a suitable tool or implement over said pipe or cable or also by applying said mass to said pipe or cable by a process of immersion or a process of rolling or casting whereupon the further coating which serves for mechanical protection may be applied.

The process of applying the protective mass by casting may, for instance, be carried out in such a manner that the respective pipe or cable is surrounded by a casting mould which forms a hollow space around the pipe or cable, said hollow space having the desired form and diameter or thickness of the protective mass to be applied. This mould is filled up with the protective mass in heated condition and removed from the pipe or cable after said mass has cooled down to normal temperature.

In this manner I provide a proper mechanical as well as electrical protection for gas and water pipes, electric cables and the like and additional protection against corrosion by merely applying a special mass such as is described in my aforementioned co-pending application Serial No. 459,835 to the pipe or cable to be protected without the use of a special core or carrier in the form of a wrapper, rope or the like such as described in my copending applications Nos. 338,052, and 459,835 and Patent No. 1,777,107 by merely applying said mass by distributing it by hand or with the aid of a suitable tool or implement or by any of the other aforementioned processes over the pipe or cable and thereupon eventually applying an additional coating of asphaltum or the like. The interior mass will serve essentially as a protective means against corrosive effects which may be of electrical or chemical nature, while the additional or outer coating serves essentially as a mechanical protection of said interior mass.

A cross section of a pipe is shown in the accompanying drawing, having the protective coatings or layers applied thereto. In the drawing, reference character 1 indicates a pipe to which a layer or coating 2 of a mass that is permanently plastic at all temperatures arising in the ground, is applied in any convenient way. An additional coating 3, which may consist of asphaltum or the like, is applied to the coating or layer 2. Jute 4 may be interposed between the layers or coatings 2 and 3 to serve as an outer mechanical reinforcement or support for the coating 2.

I claim:

Underground gas or water pipes, electric cables or the like covered on the outside with a covering which is permanently plastic at all temperatures arising in the ground, said covering being adapted to become sufficiently soft in hot condition to be applied to a pipe or cable and being sufficiently stiff at ordinary temperatures to remain in position without the use of any interior carrier or mechanical support for it, and an additional coating applied around said covering, said additional coating consisting of asphaltum or the like.

In testimony whereof I affix my signature.

PAUL F. SCHADE.